(12) United States Patent
Gassen et al.

(10) Patent No.: US 6,312,340 B1
(45) Date of Patent: Nov. 6, 2001

(54) HOLLOW DRIVE SHAFT WITH INTEGRATED VIBRATION ABSORBER

(75) Inventors: Achim Gassen, Köln; Jürgen Bebermeier, Garbsen; Jürgen Sellschopp, Braunschweig; Jürgen Maretzke, Isenbüttel, all of (DE)

(73) Assignees: Contitech Formteile GmbH, Hanover; Volkswagen AG, Wolfsburg, both of (DE)

(*) Notice: Subject to any disclaimer, the term of this patent is extended or adjusted under 35 U.S.C. 154(b) by 0 days.

(21) Appl. No.: 09/446,184
(22) PCT Filed: Jun. 17, 1998
(86) PCT No.: PCT/EP98/03635
§ 371 Date: Feb. 28, 2000
§ 102(e) Date: Feb. 28, 2000
(87) PCT Pub. No.: WO98/59185
PCT Pub. Date: Dec. 30, 1998

(30) Foreign Application Priority Data

Jun. 20, 1997 (DE) .............................. 197 26 293

(51) Int. Cl.⁷ ........................................... F16C 3/02
(52) U.S. Cl. .......................................... 464/180; 180/902
(58) Field of Search ..................... 464/180, 183; 180/380, 381, 902; 138/89; 188/379; 74/574

(56) References Cited

U.S. PATENT DOCUMENTS

| | | | | |
|---|---|---|---|---|
| 2,028,930 | * | 1/1936 | Taylor | 188/379 X |
| 3,667,640 | * | 6/1972 | Morrow | 138/89 X |
| 4,207,957 | | 6/1980 | Layher et al. | |
| 5,326,324 | | 7/1994 | Hamada. | |

FOREIGN PATENT DOCUMENTS

| | | |
|---|---|---|
| 1113367 | 8/1961 | (DE). |
| 1178303 | 9/1964 | (DE). |
| 1755860 | 12/1971 | (DE). |
| 2747225 | 4/1979 | (DE). |
| 3632418 | 3/1988 | (DE). |
| 08-233031 | 1/1997 | (JP). |
| 752072 * | 7/1980 | (SU) ................................. 188/379 |

OTHER PUBLICATIONS

"Der Antriebsstrang des Porsche 924" by R. v. Sivers et al, ATZ Automobiltech–nische Zeitschrift 78 (1976) 6, pp. 259 to 262.

* cited by examiner

Primary Examiner—Lynne H. Browne
Assistant Examiner—Greg Binda
(74) Attorney, Agent, or Firm—Walter Ottesen

(57) ABSTRACT

An effective reduction of vibration overshoots is intended to be effected in a drive shaft, which is configured as a hollow shaft (8), with simple means at the particular vibration maximum (vibration antinode).

A vibration absorber (2) is arranged within the hollow shaft (8) and includes a damping mass (absorber mass) (4) and an elastic coupling element (6). The absorber mass (4) is operatively connected to the inner wall of the hollow drive shaft (8) via the elastic coupling (6). The absorber mass is configured to be rotationally symmetrical and axially symmetrical and has, at its center, a constriction (12) for accommodating the elastic coupling element (6).

For use as a drive shaft (hollow shaft) (8), which is built in in the vehicle transverse direction, and for use as a drive shaft (8) (cardanic shaft configured as hollow shaft) which is built in in the vehicle longitudinal direction.

11 Claims, 1 Drawing Sheet

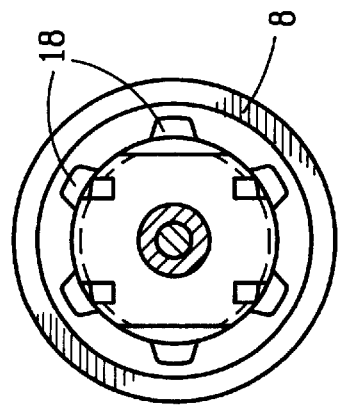
FIG. 2b
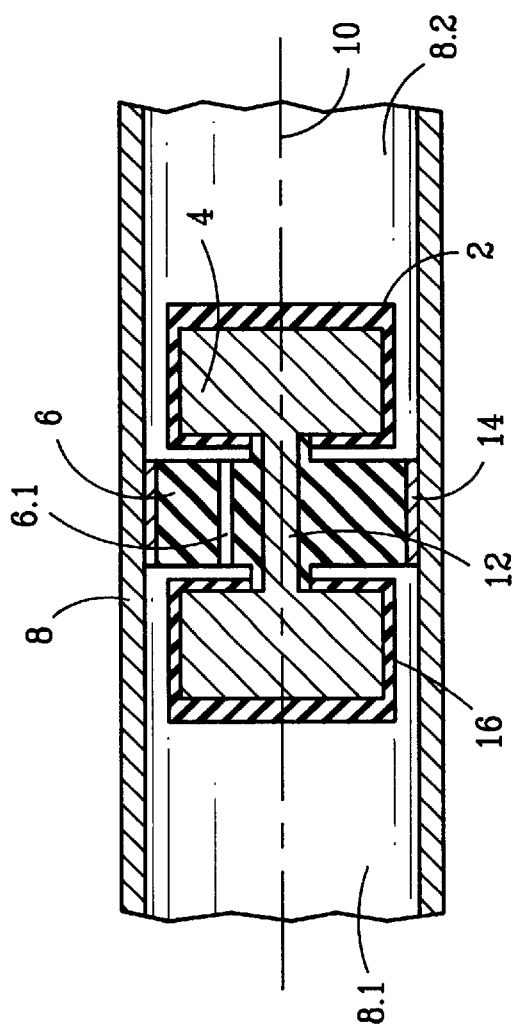
FIG. 1
FIG. 2a

HOLLOW DRIVE SHAFT WITH INTEGRATED VIBRATION ABSORBER

FIELD OF THE INVENTION

The invention relates to a hollow drive shaft having an integrated vibration absorber especially for a motor vehicle.

BACKGROUND OF THE INVENTION

In a motor vehicle, the torque from a drive motor (especially an internal combustion engine) is to be transmitted via a flywheel, a clutch, a transmission, a differential (change-speed gear) to a drive wheel.

If two of the above-mentioned components are arranged spatially apart from one another, then they are to be connected to each other by a drive shaft for the torque which is to be transmitted from one component to the other component. Drive shafts of this kind tend to oscillate and vibrate in an unwanted manner.

In "Automobiltechnische Zeitschrift" of Jun. 6, 1976, starting at page 259, a drive shaft is described which is surrounded by a tube functioning as an ancillary support. A bearing having a rubber ring is mounted between the shaft and the tube and is intended to insulate against vibrations. This kind of vibration damping has been determined to be completely inadequate. In this connection, reference can be made, for example, to German patent publication 2,747,225, column 1, lines 38 to 51.

German patent publication 1,178,303 in combination with German patent publication 1,113,367 describe a drive shaft configured as a metal rod which is surrounded by vibration dampers at specific locations.

The problem of this kind of massive drive shaft having external dampers is that these external dampers have a relatively large radius. These vibration absorber masses are also not protected against external effects such as dirt and damage because they are mounted outside on the massive drive axle.

Besides vibration dampers for complete shafts wherein the vibration damper is mounted outside on the drive shaft configured from solid material, vibration dampers are also known which are mounted within a hollow supporting tube fixed against rotation and surrounding the massive drive shaft.

German patent publication 1,755,860 covers a vibration absorber of a drive shaft wherein the vibration absorbers are configured in the form of annular-shaped rubber springs burdened by mass. These rubber springs are disposed between the drive shaft and, if required, a hollow tube serving as protection. The hollow tube is optionally provided and is intended to serve, if needed, as an additional vibration absorber mass. This hollow tube is more or less rigidly connected to the engine block and possibly also to other vehicle parts. For this reason, a most inadequate reduction of the vibrations emanating from the engine results.

A trouble-free decoupling of the vibration absorber mass and other masses is not possible with this configuration.

A complete separation of massive drive shaft and hollow tube is provided in the arrangement described in German patent publication 2,747,225. However, here a vibration absorber mass is only mounted on the hollow tube. It is, however, the drive axle itself which preferably tends to unwanted vibrations. For this drive axle, no damping measures whatsoever are provided so that such a vibrating axle can transmit its vibrations via the components (engine, transmission, et cetera) more or less unhindered to the vehicle. These components are connected force-tight to the drive axle.

Hollow shafts are also known. In view of the teaching which can be taken from the state of the art described above, the person of skill would arrange the required damping on the outer side of the hollow shaft. The person of skill would then be confronted with the difficulties known from massive drive shafts.

Vibration dampers for hollow shafts have, however, also been suggested wherein the vibration damper is mounted within the hollow shaft. Proceeding from a simple embodiment comprising matching mass and elastic layer, German patent publication 3,632,418 describes a vibration absorber wherein a matching mass is connected via an elastic covering to the inner wall of a drive shaft as well as via a further elastic layer to an absorber mass. Apart from the consideration that this absorber arrangement is configured asymmetrically with respect to a cross section, it exhibits a considerable structural length in the axial direction. For these reasons, this kind of vibration absorber cannot be mounted on the antinode of vibration of a tube shaft tending to vibrate. The further embodiment wherein a deformable body can be clamped in the hollow shaft likewise has a considerable axial length. Here, the same disadvantages already mentioned are presented.

SUMMARY OF THE INVENTION

The object of the invention is to achieve an effective reduction of vibration overshoots at bending resonances with simple means on a drive shaft configured as a hollow axle while avoiding the known disadvantages.

The above object is achieved with an arrangement according to the invention in that the absorber mass, which is located within the hollow shaft, is configured to be rotationally symmetric and has a center constriction for receiving the elastic coupling element.

The essence of the invention is a vibration absorber which is mounted directly in the hollow drive shaft and thereby reduces vibrations directly at the drive shaft while saving space.

No additional space requirement exists because of the arrangement within the tube shaft. The vibration absorber according to the invention can be inexpensively manufactured because of the simple configuration thereof. The elastic coupling element is configured as a rubber ring and exhibits only slight longitudinal expansion. In this way, the vibration absorber can be mounted in a targeted manner on the particular vibration maximum (vibration antinode) of the hollow tube.

Bending vibrations are absorbed with the vibration damper according to the invention. The vibration damper (vibration absorber) is configured so as to be axially symmetrical and has only a slight mass. For this reason, its imbalance is only very slight even in the deflected state. The danger of build up of an imbalance is therefore hardly a concern.

The vibration absorber is configured so as to be compact and, because it is mounted within the hollow shaft, it is reliably protected from external interferences.

Preferably, the vibration absorber is premounted in a slotted sleeve thereby facilitating the assembly. Because of a higher pretensioning of the rubber, one can work with a reduced inherent stress of the slotted sleeve. The sleeve is a cost-effective metal part.

The sleeve can be selectively made of a material having poor thermal conductivity (for example, plastic) to reduce the temperature loading of the coupling element in subsequent processing steps (welding, hardening, lacquering).

The elastic coupling element preferably comprises a material of the elastomer group or a technically like material.

Different resonance frequencies can be realized with different grades of hardness. The subsequent warming of the elastomer in further production steps can be considered (for example, targeted undervulcanization) by a suitable selection of the vulcanizing parameters.

The absorber is preferably so matched that the inherent frequency amounts to 55% to 85% of the inherent frequency of the shaft. In this way, the amplitude of the first of the two resonance locations which result is less than the amplitude of the second resonance location.

The absorber mass, coupling element and press-in sleeve can be selectively vulcanized one to the other, pressed together or joined to each other with adhesive.

The positioning in the hollow shaft is ensured by the pressed-in sleeve. A purposeful profiling of the pressed-in sleeve fixes the rubber spring and secures the absorber position.

The use of only a single coupling element, which is configured as a spring ring, makes a defined simple press-in possible.

An axial bore or a slit in the coupling element makes a pressure compensation possible between the hollow spaces of the right and left shaft halves and thereby prevents unwanted conditions of stress which can develop because of the generation of gas when welding on the shaft ends.

To avoid wobbling oscillations, a ratio of width of the rubber spring to the length of the absorber mass of 0.2 to 0.4 has been shown to be especially suitable. The absorber mass is usually 100 to 200 grams, in extreme cases 50 to 500 grams.

An inherent frequency of the absorber in the range of 70 to 300 Hz results in combination with an elastomeric damping of 3 to 15°.

The absorber according to the invention can preferably be used starting at a shaft diameter of approximately 20 mm. Here, the diameter of the absorber mass should be at least 2 mm less than the tube interior diameter. The mass can be rubberized to prevent knocking noises in the tube.

A further embodiment of this idea is to arrange knocking nubs on the periphery of the absorber mass.

The damped hollow shaft according to the invention can preferably be used as drive shaft of front-driving vehicles with the drive shaft being mounted in the transverse direction of the vehicle; or, this damped hollow shaft can be used as drive shaft mounted in the longitudinal direction of the vehicle (cardanic shaft configured as a hollow shaft) of rear-driven vehicles with the engine mounted in the front.

BRIEF DESCRIPTION OF THE DRAWING

In the following, the vibration absorber, which is configured, according to the invention, within a hollow shaft, is described in greater detail with respect to an embodiment.

FIG. 1 shows a detail view, in longitudinal section, of a hollow drive shaft having an integrated vibration absorber.

FIG. 2a shows a longitudinal section of a modification of the vibration absorber and FIG. 2b shows a cross section of the modification of the vibration absorber of the invention.

DESCRIPTION OF THE PREFERRED EMBODIMENTS OF THE INVENTION

The vibration damper (vibration absorber) 2 includes a vibration damping mass 4 and an elastic coupling element 6. Both (4, 6) are disposed within a hollow shaft (tube shaft) 8. The mass 4 is operatively connected via coupling element 6 to the tube shaft 8. The vibration absorber mass 4 is a rotationally-symmetrical and axially-symmetrical structure referred to the tube axis 10. The vibration absorber mass 4 has a constriction 12 at its center for accommodating a coupling element (rubber bearing) 6 which is configured to be ring shaped. In the embodiment shown, a sleeve 14 is located between the rubber bearing 6 and the interior wall of the hollow shaft 8. Preferably, this sleeve 14 has a slit which facilitates assembly of the vibration damper 2 and pressure compensation. The mass 4 of the vibration absorber 2 is completely surrounded by a rubber skin 16.

The coupling element 6 has an axial cutout 6.1 (bore, slot) connecting the hollow spaces (8.1 and 8.2) on respective ends of the vibration absorber 2 to each other.

In the further embodiment of the vibration absorber 2 shown in FIGS. 2a and 2b, knocking nubs 18 are arranged on the periphery of the absorber mass 4.

The slotted sleeve 14 can be selectively made of a poorly thermally conducting material such as plastic.

The vibration absorber 2 has a resonant or inherent frequency which is matched in such a manner that the resonant or inherent frequency of the vibration absorber is 55 to 85% of the resonant or inherent frequency of the hollow shaft 8 without the vibration absorber.

The absorber mass 4, the elastic coupling element 6 and the slotted sleeve 14 can be vulcanized to each other.

Alternatively, the absorber mass 4, the elastic coupling element 6 and the slotted sleeve 14 can be pressed to each other. As still another alternative, the absorber mass 4, the elastic coupling element 6 and the slotted sleeve 14 can be joined to each other by adhesive.

As shown, the elastic coupling element 6 has an axial cutout 6.1 connecting the hollow spaces (8.1 and 8.20) on respective ends of the vibration absorber 2 to each other. The axial cutout 6.1 can be a bore or a slot.

HOLLOW SHAFT HAVING AN INTEGRATED VIBRATION ABSORBER LIST OF REFERENCE NUMERALS

2 Vibration damper, vibration absorber
4 Vibration damping mass, absorber mass
6 Coupling element, coupling element, rubber bearing, rubber ring
6.1 Axial cutout
8 Hollow shaft, tube shaft, (hollow) drive shaft
8.1, 8.2 Hollow spaces within the hollow shaft
10 Tube axis
12 Constriction
14 (Press-in) sleeve
16 Rubber skin
18 Knocking nubs

What is claimed is:

1. A hollow shaft assembly for a motor vehicle, the hollow shaft assembly comprising:

a hollow shaft having an inner wall surface defining an interior space and having a longitudinal axis;

a vibration absorber mounted in said interior space;

said vibration absorber including an absorber mass and an elastic coupling element for operatively connecting said absorber mass to said inner wall surface;

said absorber mass being configured so as to be rotationally symmetrical and axially symmetrical with respect to said longitudinal axis;

said absorber mass having a center region and being configured to have a constriction at said center region for accommodating said elastic coupling element therein; and, a slotted sleeve arranged between said elastic coupling element and said inner wall surface of said hollow shaft.

2. The hollow shaft assembly of claim 1, said slotted sleeve being made of a poorly thermally conducting material.

3. The hollow shaft assembly of claim 1, said elastic coupling element being made of an elastomeric material.

4. The hollow shaft assembly of claim 1, said absorber mass, said elastic coupling element and said slotted sleeve being vulcanized to each other.

5. The hollow shaft assembly of claim 1, said absorber mass, said elastic coupling element and said slotted sleeve being pressed to each other.

6. The hollow shaft assembly of claim 1, said absorber mass, said elastic coupling element and said slotted sleeve being joined to each other by adhesive.

7. A hollow shaft assembly for a motor vehicle, the hollow shaft assembly comprising:

a hollow shaft having an inner wall surface defining an interior space and having a longitudinal axis;

a vibration absorber mounted in said interior space;

said vibration absorber including an absorber mass and an elastic coupling element for operatively connecting said absorber mass to said inner wall surface;

said absorber mass being configured so as to be rotationally symmetrical and axially symmetrical with respect to said longitudinal axis;

said absorber mass having a center region and being configured to have a constriction at said center region for accommodating said elastic coupling element therein; and, said vibration absorber being surrounded by a rubber skin and said absorber mass having peripheral regions facing toward said inner wall surface at opposite ends of said center region and having a plurality of radial knocking nubs formed on each of said peripheral regions.

8. The hollow shaft assembly of claim 7, said elastic coupling element having an axial cutout connecting the hollow spaces on respective ends of said vibration absorber to each other.

9. The hollow shaft assembly of claim 8, said axial cutout being a bore.

10. The hollow shaft assembly of claim 8, said axial cutout being a slot.

11. A hollow shaft assembly for a motor vehicle, the hollow shaft assembly comprising:

a hollow shaft having an inner wall surface defining an interior space and having a longitudinal axis;

a vibration absorber mounted in said interior space;

said vibration absorber including an absorber mass and an elastic coupling element for operatively connecting said absorber mass to said inner wall surface;

said absorber mass being configured so as to be rotationally symmetrical and axially symmetrical with respect to said longitudinal axis;

said absorber mass having a center region and being configured to have a constriction at said center region for accommodating said elastic coupling element therein; and, said vibration absorber having a resonant or inherent frequency which is matched in such a manner that said resonant or inherent frequency of said vibration absorber is 55 to 85% of the resonant or inherent frequency of said hollow shaft without said vibration absorber.

* * * * *